US010019891B1

(12) United States Patent
Bajaj et al.

(10) Patent No.: US 10,019,891 B1
(45) Date of Patent: Jul. 10, 2018

(54) SMOKE DETECTOR FOR DISTINGUISHING BETWEEN AN ALARM CONDITION AND A NUISANCE CONDITION

(71) Applicant: Google LLC, Mountain View, CA (US)

(72) Inventors: Kunal Kishore Bajaj, Mountain View, CA (US); Andrii Korchak, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/473,281

(22) Filed: Mar. 29, 2017

(51) Int. Cl.
*G08B 29/18* (2006.01)
*G08B 17/10* (2006.01)
*B60R 25/10* (2013.01)

(52) U.S. Cl.
CPC ........... *G08B 29/185* (2013.01); *G08B 17/10* (2013.01)

(58) Field of Classification Search
None
See application file for complete search history.

(56) References Cited

U.S. PATENT DOCUMENTS 4,126,790 A * 11/1978 Solomon ................ G08B 17/10 250/564
4,300,048 A * 11/1981 Barbier .................. G08B 17/12 250/338.1
4,300,133 A * 11/1981 Solomon ................ G08B 17/10 250/574
4,528,555 A * 7/1985 Yasukawa .......... G01N 33/0062 250/573
5,477,218 A * 12/1995 Manmoto ............ G08B 17/107 250/574
5,666,949 A * 9/1997 Debe .................... A62B 18/088 116/206
6,507,023 B1 1/2003 Parham et al.
2011/0031419 A1* 2/2011 Fukui ................... G08B 17/107 250/574
2011/0050894 A1* 3/2011 Jelinek ................. G08B 17/125 348/143

(Continued)

OTHER PUBLICATIONS

Siemens; Aspirating Smoke Detection Very Sensitive and Reliable Fire Detection Through Differentiation Between Smoke and Deceptive Phenomena, White Paper, Jun. 9, 2015, www.siemens.com/asd; 9 pages.

*Primary Examiner* — Fekadeselassie Girma
(74) *Attorney, Agent, or Firm* — Kilpatrick Townsend & Stockton LLP

(57) ABSTRACT

A method for distinguishing between an alarm condition and a nuisance condition in a smoke detector. The smoke detector comprises an illuminator and a light sensor. The method includes measuring a voltage signal in response to an electromagnetic signal emitted by the illuminator, and comparing the voltage signal to an alarm threshold. A rate of change of the voltage signal is determined in response to the comparison of the voltage signal and the alarm threshold. A first frequency component of a first portion of the voltage signal and a second frequency component of a second portion of the voltage signal is determined. The first frequency component and the second frequency component are compared to distinguish between the alarm condition and the nuisance condition. An indication of the alarm condition and the nuisance condition is respectively generated upon an identification of the alarm condition and the nuisance condition.

20 Claims, 11 Drawing Sheets

(56) References Cited

U.S. PATENT DOCUMENTS

| | | | | |
|---|---|---|---|---|
| 2012/0188067 | A1* | 7/2012 | Xiao | B60R 25/102 340/426.18 |
| 2013/0207807 | A1 | 8/2013 | Popper | |
| 2015/0348400 | A1* | 12/2015 | Zribi | G08B 29/185 340/506 |

* cited by examiner

SMOKE DETECTOR FOR DISTINGUISHING BETWEEN AN ALARM CONDITION AND A NUISANCE CONDITION

BACKGROUND

Photoelectric smoke alarms in residential and commercial buildings include a smoke chamber, a light source, and a photodetector. When smoke from a burning object enters the smoke chamber, the photodetector output increases or decreases to a threshold and an alarm is generated to apprise the user of an alarm condition. The photodetector output is also affected when dust gets entrapped in the smoke chamber, resulting in a false alarm.

SUMMARY OF THE EMBODIMENTS

In an embodiment, a method distinguishes between an alarm condition and a nuisance condition in a smoke detector. The smoke detector includes an illuminator and a light sensor. The method includes the step of measuring a voltage signal in response to an electromagnetic signal emitted by the illuminator, and the step of comparing the voltage signal to an alarm threshold. A rate of change of the voltage signal is determined in response to the comparison of the voltage signal and the alarm threshold. A first frequency component of a first portion of the voltage signal and a second frequency component of a second portion of the voltage signal is determined. The first frequency component and the second frequency component are compared to distinguish between the alarm condition and the nuisance condition. An indication of the alarm condition is generated upon an identification of the alarm condition, and an indication of the nuisance condition is generated upon an identification of the nuisance condition.

In another embodiment, a smoke detector includes an illuminator configured to emit an electromagnetic signal, and a light sensor configured to generate a voltage signal in response to the electromagnetic signal. The smoke detector has a memory that stores computer-readable instructions. A processor is configured to execute the instructions to: (i) compare the voltage signal to an alarm threshold; (ii) determine a rate of change of the voltage signal; (iii) compare the rate of change of the voltage signal to a slope threshold; and (iv) determine a first frequency component of a first portion of the voltage signal and a second frequency component of a second portion of the voltage signal.

In yet another embodiment, a method for operating a smoke detector comprising an illuminator and a light sensor comprises the step of measuring a voltage signal in response to an electromagnetic signal emitted by the illuminator. The method includes the step of comparing the voltage signal to an alarm threshold, and the step of determining a rate of change of the voltage signal in response to the comparison of the voltage signal and the alarm threshold. The method comprises the step of determining a first frequency component of a first portion of the voltage signal and a second frequency component of a second portion of the voltage signal upon the determination of the rate of change.

DETAILED DESCRIPTION OF THE EMBODIMENTS

Figure 1:
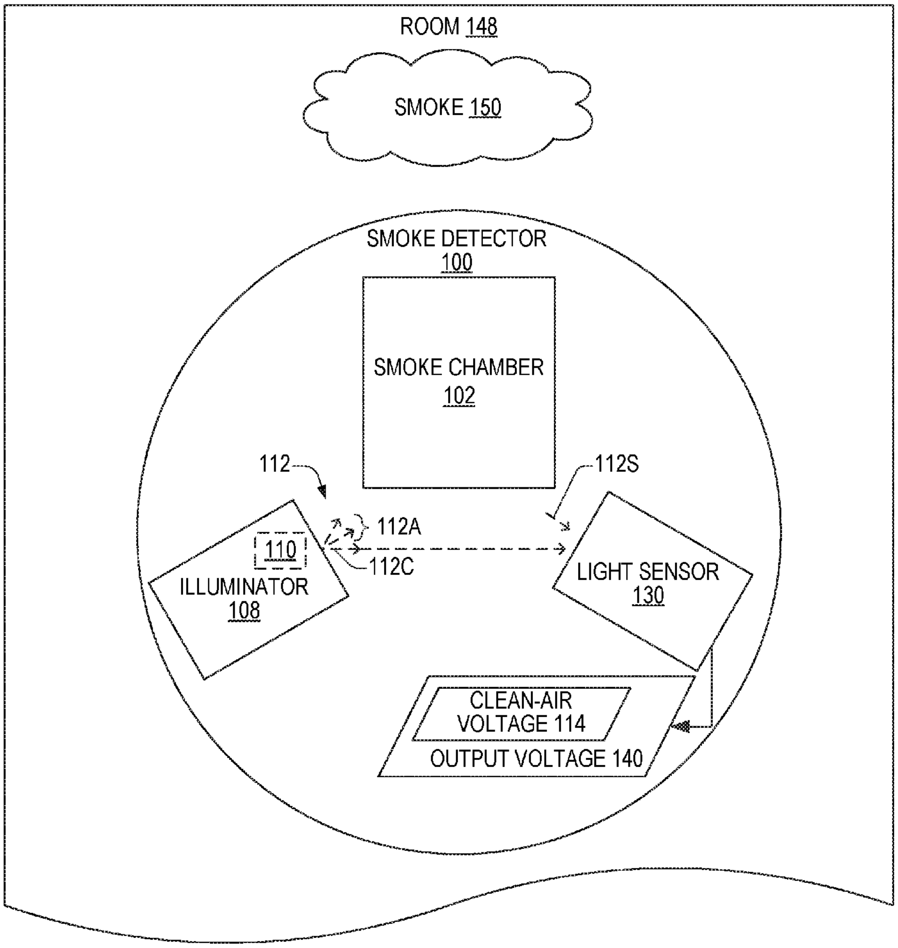
FIG. 1 is a schematic diagram of a smoke detector, in an embodiment.

FIG. 1 is a schematic diagram of an example photoelectric light scattering smoke detector 100 in a room 148 that includes smoke 150. Smoke detector 100 includes a smoke chamber 102, an illuminator 108, and a light sensor 130. Illuminator 108 may include one or more light sources 110, which may be a light-emitting diode (LED), laser diode, or other light source known in the art. Light sensor 130 may include one or more photodetectors.

Illuminator 108 emits light 112, which includes light portions 112A and 112C. Light portion 112A propagates towards the smoke chamber 102 and light portion 112C propagates towards the light sensor 130. Light sensor 130 produces an output voltage 140 in response to detecting light portion 112C. In a "clean-air" condition, when smoke chamber 102 contains no smoke, light sensor 130 detects only light portion 112C and produces a corresponding clean-air current and associated clean-air voltage 114. While in that state, the output voltage 140 (which is thus at a clean air voltage level) can be thought of as being in a clean air condition. However, when smoke 150 is in smoke chamber 102, smoke 150 scatters part of light portion 112A as scattered light 112S toward light sensor 130, which increases output voltage 140. In the clean-air state, when smoke chamber 102 contains no smoke, light portion 112A does not reach light sensor 130.

It is envisioned that the spatial arrangement of smoke chamber 102, illuminator 108, and light sensor 130 may differ from the arrangement illustrated in FIG. 1. Without departing from the scope hereof, smoke detector 100 may be a photoelectric light obscuration smoke detector, such that output voltage 140 falls below clean-air voltage 114 when smoke 150 is in smoke chamber 102.

Figure 2:
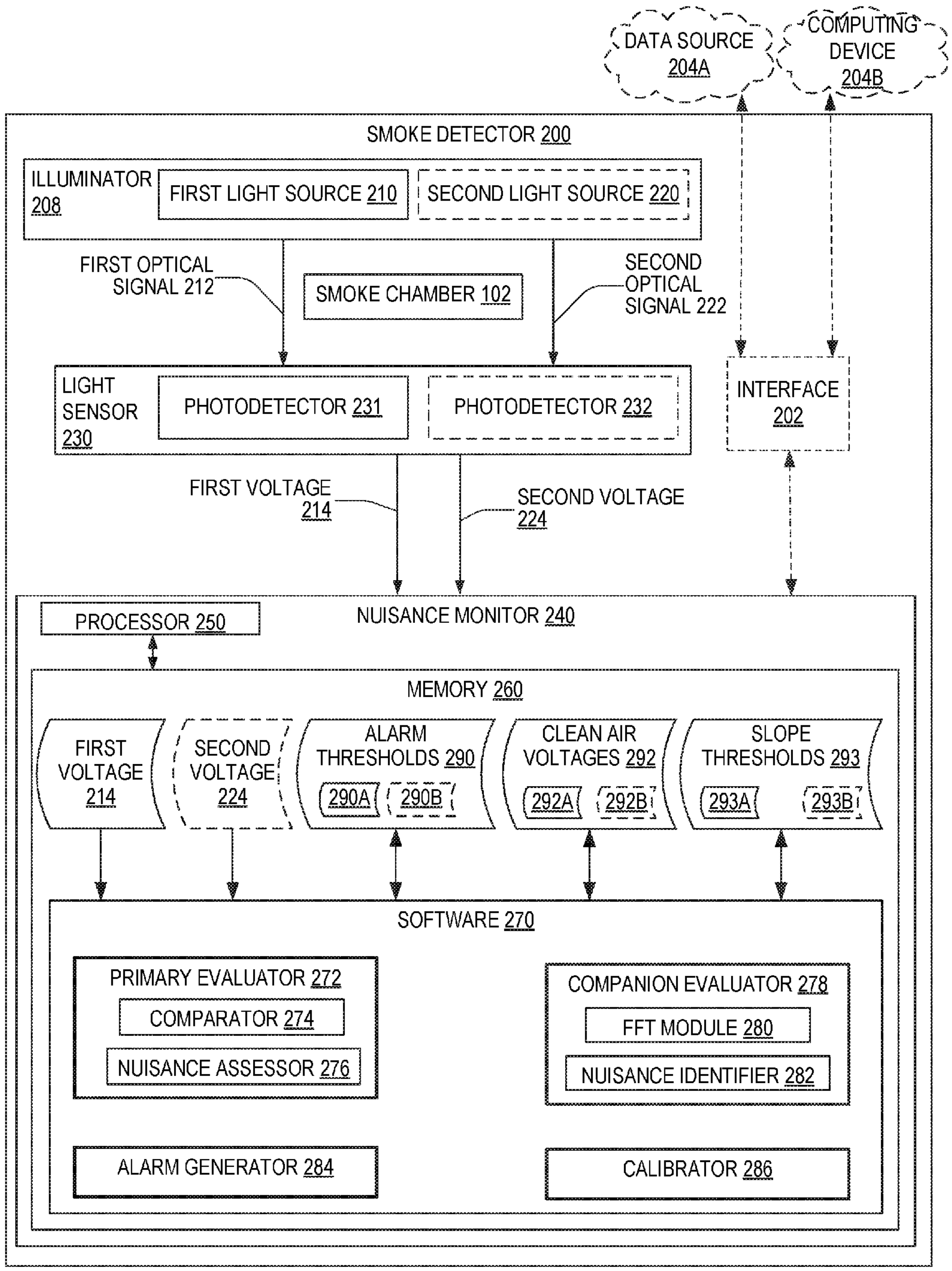
FIG. 2 is a schematic diagram of a smoke detector, which is a more detailed example of the smoke detector of FIG. 1.

FIG. 2 is a schematic diagram of a smoke detector 200, which is an example of smoke detector 100. Smoke detector 200 may effectuate smoke detection via at least one of photoelectric light scattering and photoelectric light obscuration. Smoke detector 200 includes illuminator 208, smoke chamber 102, a light sensor 230, and a nuisance monitor 240.

Illuminator 208 is an example of illuminator 108 and includes a first light source 210. Light sensor 230 is an example of light sensor 130 and includes a first photodetector 231. Illuminator 208 may include a second light source 220 and light sensor 230 may include a second photodetector 232. Light sources 210 and 220 are each an example of light source 110. In some embodiments, the number of light source(s) and photodetector(s) in the illuminator 208 and light sensor 230, respectively, may be different (e.g., the illuminator 208 may have two light sources and the light sensor 230 may have a solitary photodetector).

The size of particles constituting smoke 150 depends on its source, e.g., on the type of process that produces smoke 150. Illuminator 208 may be configured to emit more than one wavelength of light into smoke chamber 102, which enables detection of, and differentiation of, types of smoke that differ in particle size. In an example mode of operation, first light source 210 emits a first optical signal 212 having a first center wavelength $\lambda_1$. Illuminator 208, e.g., via second light source 220, emits a second optical signal 222 having a second center wavelength $\lambda_2$.

In embodiments, second center wavelength $\lambda_2$ exceeds the first center wavelength by at least twenty percent of first center wavelength $\lambda_1$. For example, light source 210 emits blue light and light source 220 emits near-infrared (near-IR) light such that $\lambda_1$ is between 0.40 μm and 0.48 μm and $\lambda_2$ is between 0.66 μm and 1.0 μm. At least one of first center wavelength $\lambda_1$ and second center wavelength $\lambda_2$ may be outside the optical portion of the electromagnetic spectrum without departing from the scope hereof. For example, first center wavelength $\lambda_1$ may be shorter than 0.40 μm and second center wavelength $\lambda_2$ may exceed 1.0 μm.

In embodiments where the smoke detector 200 includes, in addition to the first light source 210 and the first photodetector 231, the second light source 220 and the second photodetector 232, the first photodetector 231 is configured to detect first center wavelength $\lambda_1$ and the second photodetector 232 is configured to detect second center wavelength $\lambda_2$. For example, first photodetector 231 includes a bandpass filter that transmits first center wavelength $\lambda_1$ and blocks second center wavelength $\lambda_2$, while second photodetector 232 includes a bandpass filter that transmits second center wavelength $\lambda_2$ and blocks first center wavelength $\lambda_1$. Photodetectors 231 and 232 may have spectral response curves optimized for first center wavelength $\lambda_1$ and second center wavelength $\lambda_2$, respectively.

Light sensor 230, specifically the first photodetector 231 thereof, is configured to produce first voltage 214 in response to the first optical signal 212. The amplitude of the first voltage 214 is proportional to, or otherwise corresponds to, the first optical signal 212. The second photodetector 232 of the light sensor 230 is configured to produce second voltage 224 in response to second optical signal 222. The amplitude of the second voltage 224 is proportional to, or otherwise corresponds to, the second optical signal 222.

Nuisance monitor 240 is a type of computer. In embodiments, nuisance monitor 240 includes a processor 250 and a memory 260, which are communicatively coupled. Memory 260 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). The processor 250 represents one or more digital processors. The processor 250 may be a microprocessor, and in embodiments, part or all of memory 260 may be integrated into processor 250. In some embodiments, the processor 250 may be configured through particularly configured hardware, such as an application specific integrated circuit (ASIC), field-programmable gate array (FPGA), etc., and/or through execution of software to perform functions in accordance with the disclosure herein.

The nuisance monitor 240, in the memory 260, stores the first voltage 214, alarm threshold(s) 290, clean air voltage(s) 292, and slope threshold(s) 293. The alarm threshold 290 includes a first alarm threshold 290A, the clean air voltage 292 includes a first clean air voltage 292A, and the slope threshold 293 includes a first slope threshold 293A, each of which relate to the first light source 210 and the first photodetector 231. In the clean-air condition, when there is no smoke in the smoke chamber 102, the first voltage 214 corresponds to the light portion 112C, and has a first value that may be generally equal to first clean air voltage 292A. When smoke 150 enters the smoke chamber 102, the photodetector 231 senses both the light portions 112C and 112S, which increases the first voltage 214 to a second value that is greater than the first value/clean air voltage 292A. The nuisance monitor 240 may be configured to generate an alarm where the value of the first voltage 214 increases to become at least equal to the first alarm threshold 290A—unless, as discussed herein, this increase in the first voltage 214 from the first value to the second value/first alarm threshold 290A is attributable to a nuisance condition as opposed to an alarm condition.

The nuisance monitor 240 includes software 270, which may be stored in a transitory or non-transitory portion of the memory 260. In an embodiment, the software 270 includes a primary evaluator 272, a companion (or secondary) evaluator 278, an alarm generator 284, and a calibrator 286, each of which may include or have associated therewith machine readable instructions to allow the nuisance monitor 240 to function as described herein.

The illustrated primary evaluator 272 includes a comparator 274 and a nuisance assessor 276. The comparator 274 is configured to compare the first voltage 214 to the first alarm threshold 290A. Under normal conditions, e.g., in the clean-air condition, the first voltage 214 is below the first alarm threshold 290A and is generally equal to the first clean air voltage 292A. In an alarm condition, e.g., where a substantial amount of smoke from a burning object enters the chamber 102, the first voltage 214 may begin to increase, and may eventually equal the first alarm threshold 290A as smoke continues to enter into the chamber 102. The increase in the first voltage 214 from the clean air voltage 292A to the first alarm threshold 290A, however, may also be attributable to dust, debris, or another foreign object (i.e., matter other than smoke generated by a burning object) in the chamber 102. The slope threshold 293 may include a first slope threshold 293A. The nuisance assessor 276 may evaluate the rate of change of the first voltage 214 in the time domain, and where this rate of change of the first voltage 214 exceeds the first slope threshold 293A, the nuisance assessor 276 may preliminarily determine that the rapid increase in the first voltage 214 to at least equal the first alarm threshold 290A is not attributable to smoke but is attributable to dust, debris, or another foreign object in the chamber 102. The primary evaluator 272, in response to the preliminary determination by the nuisance assessor 276, may call the companion evaluator 278 for additional evaluation and to confirm that the rapid increase in the first voltage 214 is due to a nuisance condition.

The primary evaluator 272 may evaluate the first voltage 214 in the time domain. Additionally, the companion evaluator 278 may evaluate the first voltage 214 in the frequency domain. In an embodiment, the companion evaluator 278 includes a Fast Fourier Transform module 280 and a nuisance identifier 282. The artisan understands that a signal, such as a signal indicating that the first voltage 214 is varying over time (herein, the "first voltage 214 signal"), may be represented in the frequency domain. The Fast Fourier Transform algorithm implemented by the FFT module 280 is a highly optimized algorithm for identifying the frequency components of a time domain signal. The Fast Fourier Transform module 280 may, in an embodiment, implement a first time domain to frequency domain transform of the first voltage 214 signal, a second time domain to frequency domain transform of the first voltage 214 signal, and a third time domain to frequency domain transform of the first voltage 214 signal. The first time domain to frequency domain transform may identify the frequency components of a first portion of the first voltage 214 signal, the second time domain to frequency domain transform may identify the frequency components of a second portion of the first voltage 214 signal, and the third time domain to frequency domain transform may identify the frequency components of a third portion of the first voltage 214 signal. In an embodiment, the first portion may correspond to the first voltage 214 signal before the first voltage 214 exhibits a rapid increase, the second portion may correspond to the first voltage 214 signal during the rapid increase, and the third portion may correspond to the first voltage 214 signal after the first voltage 214 levels off subsequent to the rapid increase. The nuisance identifier 282 may compare the first transform, the second transform, and the third transform, and discriminate between a nuisance condition and an alarm condition based on this comparison. Where the nuisance identifier 282 determines that the rapid increase in the first voltage 214 is attributable to a nuisance condition, no alarm may be generated and the calibrator 286 may recalibrate the first alarm threshold 290A. Alternately, where the first voltage 214 at least equals the first alarm threshold 290A and a nuisance condition is not identified, the alarm generator 284 may generate an alarm to apprise the user of the alarm condition.

Smoke detector 200 may include a network interface 202 that communicatively couples the nuisance monitor 240 to data source 204A and, in some embodiments, a computing device 204B. Remote data source 204A is a server, for example. Remote data source 204A may provide nuisance monitor 240 with updated versions of at least one of the alarm threshold 290, clean air voltage 292, and slope threshold 293. Interface 202 is, for example, a network interface such that remote data source 204A and nuisance monitor 240 communicate via a wired communication channel, a wireless communication channel, or a combination thereof. In an embodiment, remote data source 204A includes at least part of nuisance monitor 240, such that at least part of nuisance monitor 240 is remotely located from illuminator 208 and light sensor 230.

When the first voltage 214 at least equals the first alarm threshold 290A, and the preliminary determination of the nuisance assessor 276 indicates that the rate of change of the first voltage 214 is less than the first slope threshold 293A, the alarm generator 284 may generate an alarm to apprise the user of the alarm condition. The alarm generator 284 may also generate an alarm where the nuisance assessor 276 preliminarily determines a nuisance condition but the nuisance identifier 282 does not confirm same. The alarm generator 284 may generate an alarm in one or more of any number of ways. For example, the smoke detector 200 may include electro-acoustic transducers, and the alarm generator 284 may cause the smoke detector 200 to generate an audible alarm where the increase in the first voltage 214 is determined to not be attributable to a nuisance condition. Additionally or alternately, the smoke detector 200 may include visual alarms (e.g., LEDs that can flash in different colors) to visually communicate the generated alarm to a user. In some embodiments, the alarm generator 284 may communicate the alarm (e.g., wirelessly, via the interface 202) to the computing device 204B of a user or administrator (e.g., a smart phone of the owner of the structure where the smoke detector 200 is located and/or to the computing device of a third party administrator). In embodiments, the smoke detector 200 may be communicatively coupled via the interface 202 to another smoke detector or smoke detectors (e.g., the smoke detector 200 in room 148 of a house may be in data communication with the smoke detector in another room of that house); in these embodiments, when an alarm is generated by the alarm generator 284 of one smoke detector 200, the alarms associated with smoke detectors in communication therewith may automatically be activated.

Figure 3:
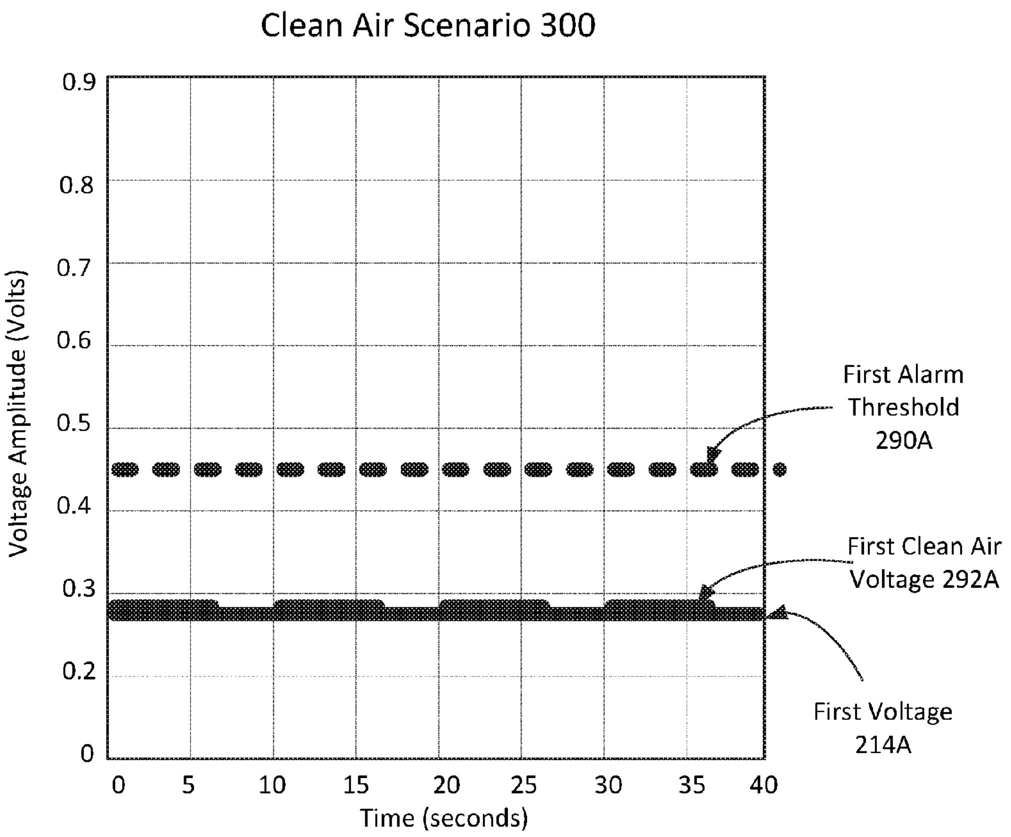
FIG. 3 is a schematic diagram illustrating a time domain output of a photodetector of the smoke detector of FIG. 2, in a clean air condition.
Figure 4:
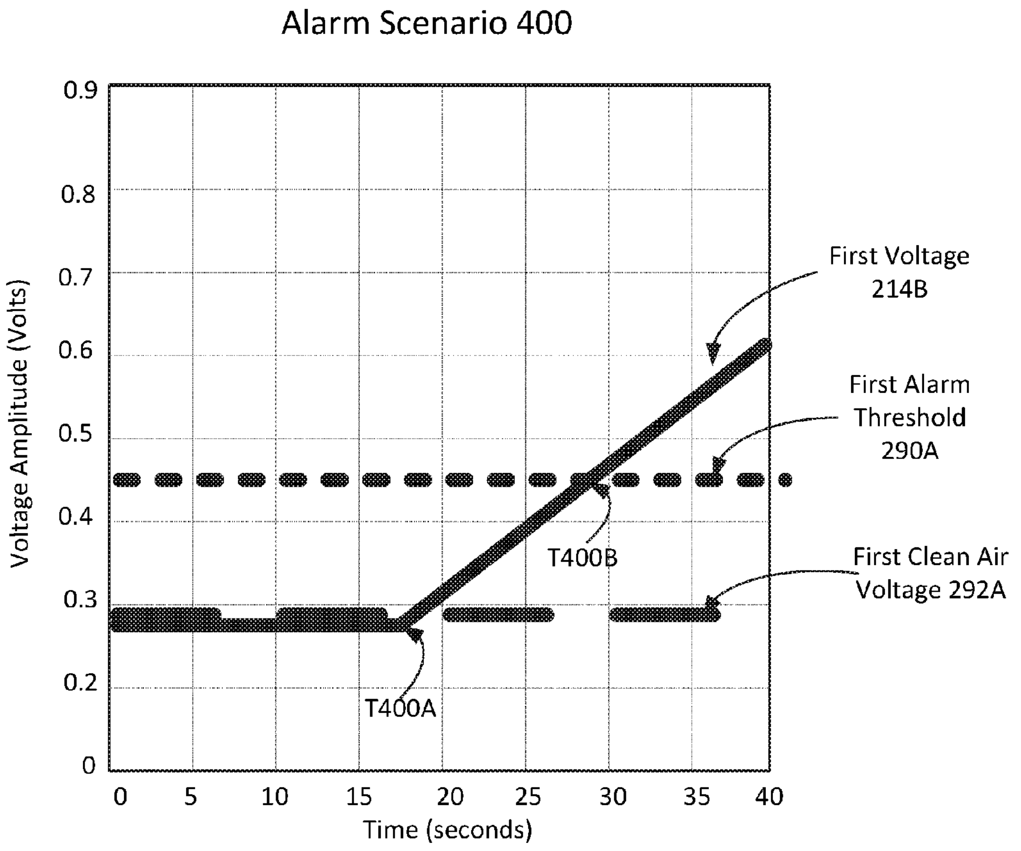
FIG. 4 is a schematic diagram illustrating a time domain output of the photodetector of the smoke detector of FIG. 2, in an alarm condition.
Figure 5:
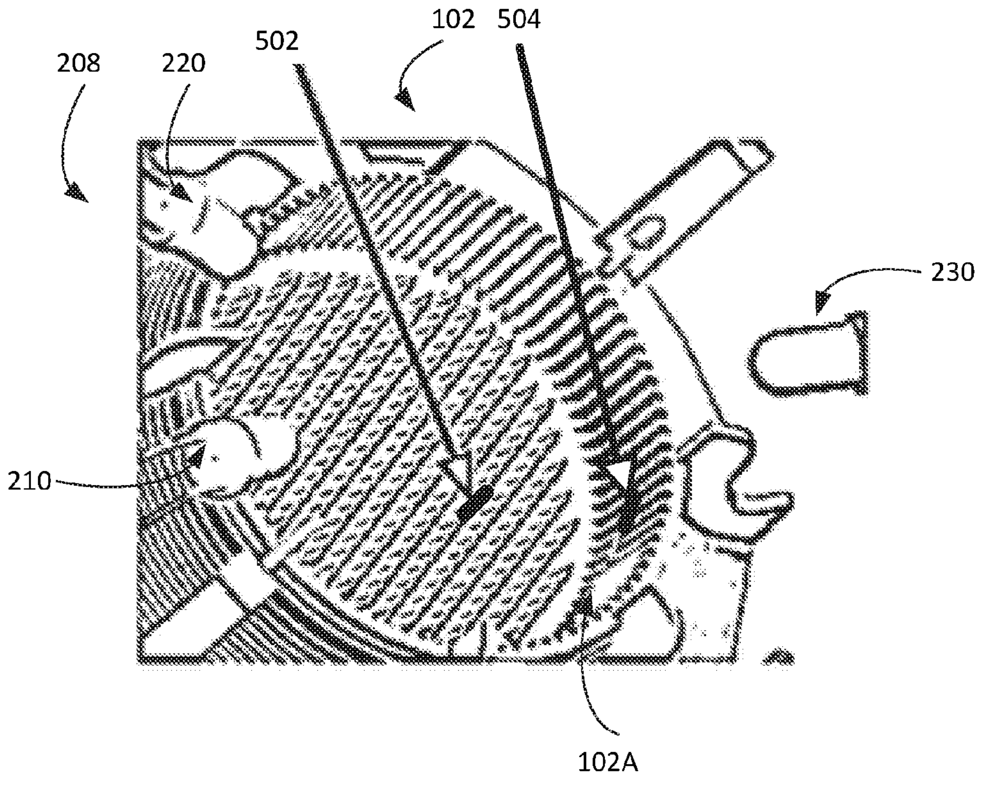
FIG. 5 is a perspective view of a smoke chamber of the smoke detector of FIG. 2, shown with dust entrapped therein.
Figure 6:
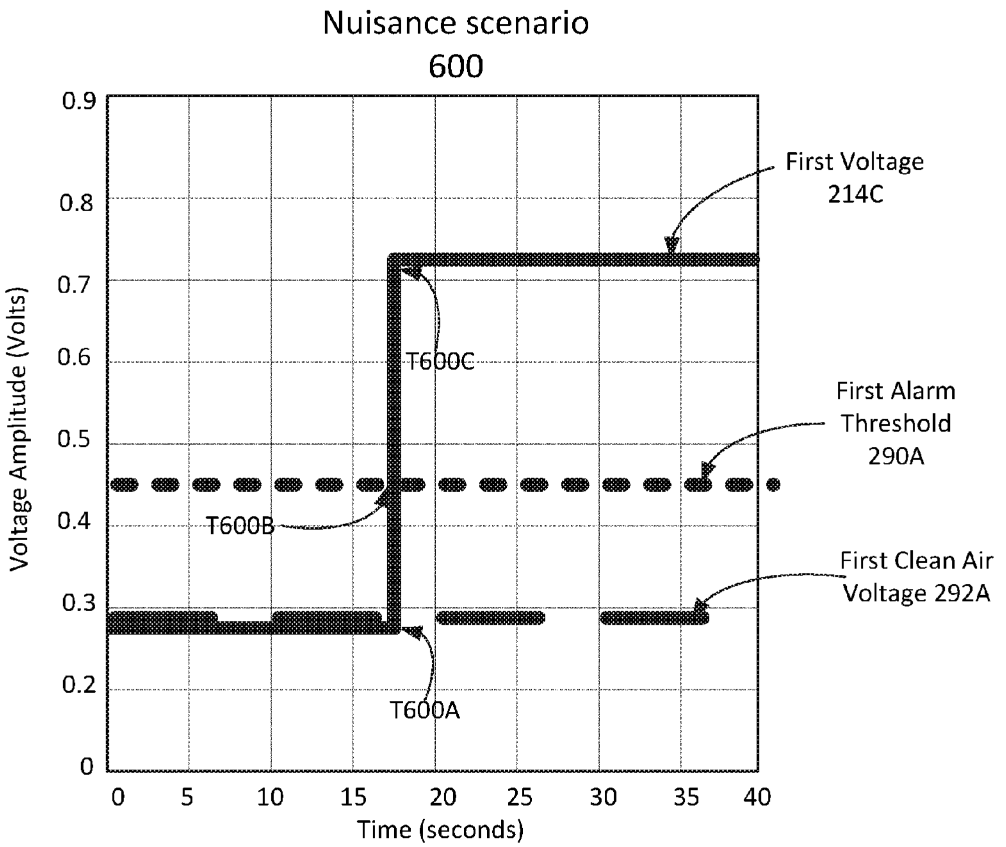
FIG. 6 is a schematic diagram illustrating a time domain output of the photodetector of the smoke detector of FIG. 2, in a nuisance condition.

Focus is directed now to FIGS. 3 through 11 to illustrate the workings of the smoke detector 200, in an embodiment. FIG. 3 depicts the time domain output of the first photodetector 231 in a clean air scenario 300. FIG. 4 depicts the time domain output of the first photodetector 231 in an alarm scenario 400. And, FIG. 6 depicts the time domain output of the first photodetector 231 in a nuisance scenario 600.

In more detail, FIG. 3 shows time domain output 214A of the first photodetector 231 in a clean air scenario 300 where the chamber 102 is devoid of smoke or another foreign object that affects the first voltage 214. In this scenario 300, the time domain output of the first photodetector 231, i.e., first voltage 214A, may be generally equal to the first clean air voltage 292A and less than the first alarm threshold 290A. For example, as shown, the amplitude of the first voltage 214A may be about 0.28V, the first clean air voltage 292A may be about 0.29V, and the first alarm threshold 290A may be about 0.45V. The clean air voltage 292A may be saved in memory upon manufacture of the smoke detector 200. A difference (e.g., a difference of 0.01V as shown) between the first clean air voltage 292A and the first voltage 214A may arise because the output of the photodetector 231 degrades over time, particularly where the photodetector 231 is an LED. The primary evaluator 272, specifically the comparator 274 thereof, may compare the first voltage 214A to the first alarm threshold 290A and determine that the first voltage 214A is less than the first alarm threshold 290A. No alarm may be generated by the nuisance monitor 240 so long as the first voltage 214A is less than the first alarm threshold 290A.

FIG. 4 shows a typical alarm scenario 400, where an increasing amount of smoke from a burning object progressively enters the chamber 102. In the illustrated alarm scenario 400, before time T400A, there is no smoke in the chamber 102, and output 214B of the first photodetector 231 is generally equal to the first clean air voltage 292A and is less than the first alarm threshold 290A. For example, before time T400A, as in FIG. 3, the amplitude of the first voltage 214B is about 0.28V, the first clean air voltage 292A is about 0.29V, and the first alarm threshold 290A is about 0.45V. At time T400A, smoke 150 from a burning object may enter the chamber 102 and cause the first voltage 214B to increase. At time T400B, the first voltage 214B may reach the first alarm threshold 290A. The comparator 274 may compare the first voltage 214B to the first alarm threshold 290A and determine that the first voltage 214B at least equals the first alarm threshold 290A. The primary evaluator 272, in response to a determination by the comparator 274 that the first voltage 214B at least equals the first alarm threshold 290A, may call the nuisance assessor 276 to evaluate the rate of change of the first voltage 214B.

The nuisance assessor 276 may compute the slope of the first voltage 214B, e.g., the slope of the first voltage 214B between time T400A and time T400B, and compare this slope with the first slope threshold 293A. The slope threshold 293A, in an embodiment, may be a 0.1V rise in the first voltage 214 (e.g., first voltage 214B) in 0.01 seconds. Because the smoke 150 from a burning object entering the chamber 102 increases gradually over time, a generally instantaneous and significant rise (e.g., a 0.1V rise in 0.01 seconds) in the first voltage 214B is unlikely to be attributable to smoke. Conversely, a rise in the first voltage 214B that is not generally instantaneous (e.g., a rise in the first voltage 214B that is less than a 0.1V rise in 0.01 seconds) may indicate smoke from a burning object entering the chamber 102. Thus, in an embodiment, the nuisance assessor 276 may determine that the increase in the first voltage 214B to the first alarm threshold 290A is attributable to smoke from a burning object (and not to dust, debris, or another foreign object) where the rate of change of the first voltage 214B is less than the slope threshold 293A (i.e., the increase in the first voltage 214B is less than a 0.1V increase in 0.01 seconds). In such case, the alarm generator 284 may generate an alarm to apprise the user of an alarm condition. Alternately, if the first voltage 214B increases to the first alarm threshold 290A and the nuisance assessor 276 determines that the first voltage 214B increased by at least 0.1V in 0.01 seconds, the nuisance assessor 276 may preliminarily determine that the increase in the first voltage 214 is due to dust, debris, or another foreign object, as opposed to smoke from a burning object; the companion evaluator 278 may then be called for additional evaluation and verification of a nuisance condition.

With respect to the example alarm scenario 400 illustrated in FIG. 4, the nuisance assessor 276 may determine that the rate of change of the first voltage 214B is less than the first slope threshold 293A. The alarm generator 284 may consequently generate an alarm to apprise the user of an alarm condition. The artisan will appreciate that the first voltage 214B in the alarm scenario 400 is merely an example and that the smoke 150 need not cause the first voltage 214B to increase linearly as shown; however, smoke 150 is unlikely to cause the first voltage 214B to increase by 0.1V or more in 0.01 seconds.

FIG. 5 shows an example smoke chamber 102 of the smoke detector 200. The chamber 102 may have associated therewith the illuminator 208 (e.g., the first light source 210 and, in embodiments, the second light source 220), and a light sensor 230 (e.g., at least one photodetector). The chamber 102 may include a lid (not shown) and a high density ray region 102A. When the smoke 150 enters the chamber 102, e.g., the high density ray region 102A thereof, the light scattered thereby (i.e., scattered light 112S, see FIG. 1) may cause the output of the light sensor 230 to increase.

The skilled artisan understands that a smoke detector, e.g., the smoke detector 200, when being installed in a wall, ceiling, or other such structure, may encounter dust (e.g., Gypsum/drywall dust), debris, or other such foreign objects (e.g., wood or silica particles) (collectively, "dust"). The dust, during installation of the smoke detector 200, or at some time thereafter, may get entrapped within the smoke chamber 102. For example, as shown in FIG. 5, dust particles 502 and 504 may get entrapped in the high density ray region 102A of the chamber 102. The dust particles 502 and 504 may affect the amount of light 112 reaching the light sensor 130, and may in-turn cause the first voltage 214 to increase generally instantaneously to at least equal the first alarm threshold 290A.

FIG. 6 illustrates the output of the first photodetector 231, i.e., first voltage 214C, in the nuisance scenario 600 where dust (e.g., dust particles 502 and 504) has become entrapped in the chamber 102. In the illustrated nuisance scenario 600, before time T600A, there is no smoke 150 or dust in the chamber 102, and output 214C of the first photodetector 231 is generally equal to the first clean air voltage 292A and is less than the first alarm threshold 290A. At time T600A, dust enters the chamber 102 and causes the first voltage 214C to increase rapidly such that the first voltage 214C equals the first alarm threshold 290A at time T600B. The first voltage 214C may continue to rapidly increase until time T600C, and level off thereafter. As can be appreciated, the slope of the first voltage 214C between time T600A and time T600B in the dust scenario 600 is greater than the slope of the first voltage 214B between time T400A and time T400B in the alarm scenario 400 of FIG. 4. The nuisance assessor 276 may determine that the slope of the first voltage 214C is at least equal to the first slope threshold 293A (e.g., that the first voltage 214C increased by at least 0.1V in 0.01 seconds). The nuisance assessor 276 may therefore preliminary determine that the rapid increase in the first voltage 214C is attributable to a nuisance condition (i.e., to dust in the chamber 102). The primary evaluator 272 may consequently call the companion evaluator 278 for additional analysis and confirmation of the nuisance condition.

Figure 7A:
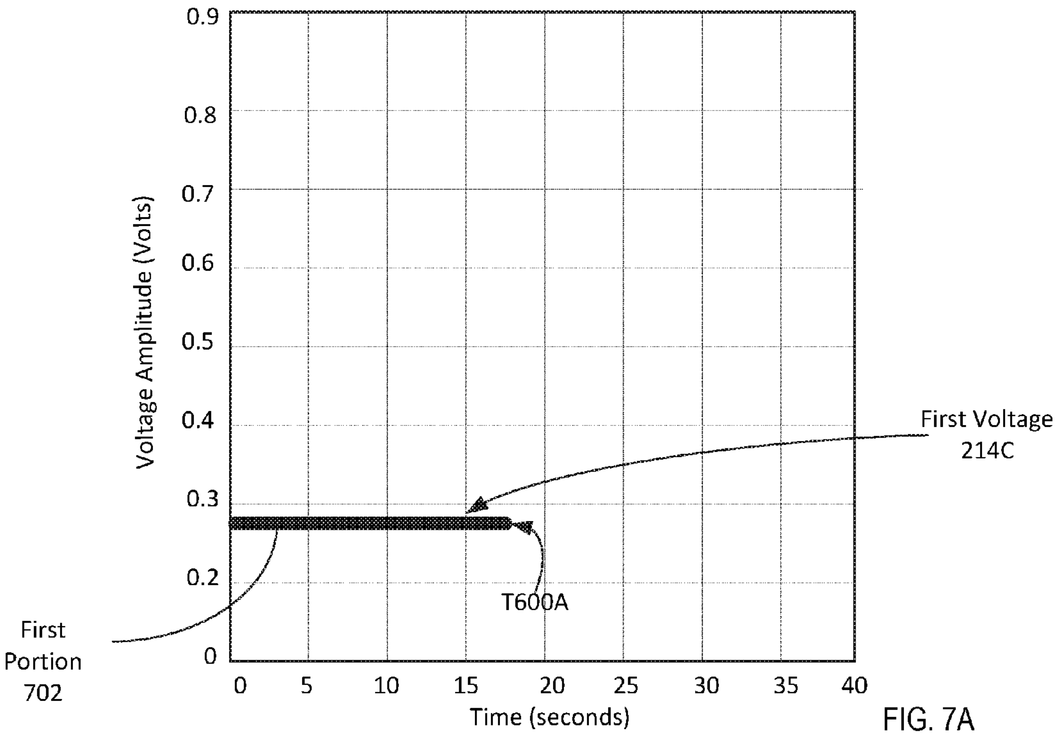
FIG. 7A is a schematic diagram depicting a first portion of the time domain output of FIG. 6.
Figure 7B:
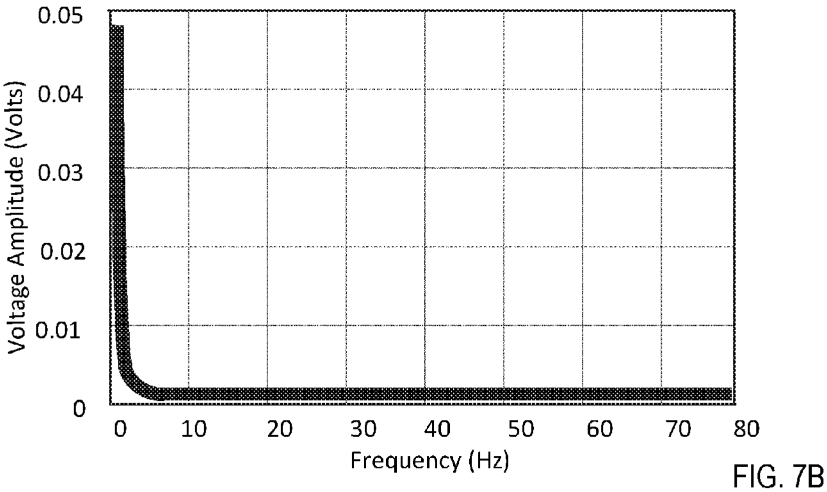
FIG. 7B is a schematic diagram depicting frequency components of the first portion of FIG. 7A.
Figure 8A:
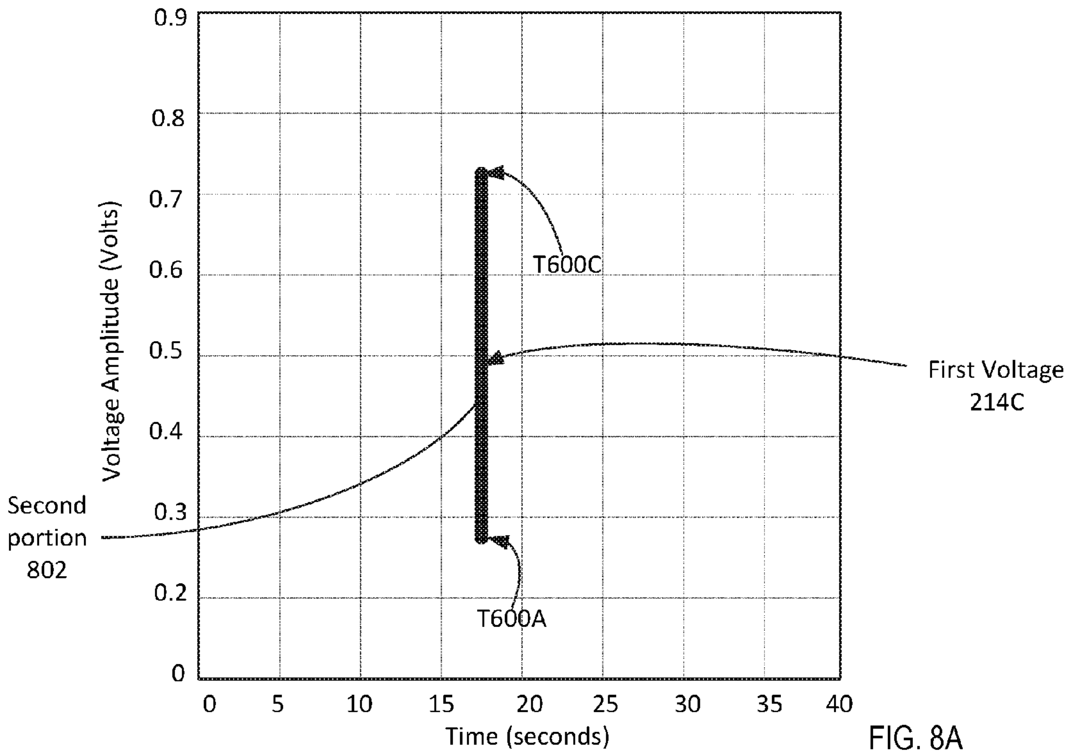
FIG. 8A is a schematic diagram depicting a second portion of the time domain output of FIG. 6.
Figure 8B:
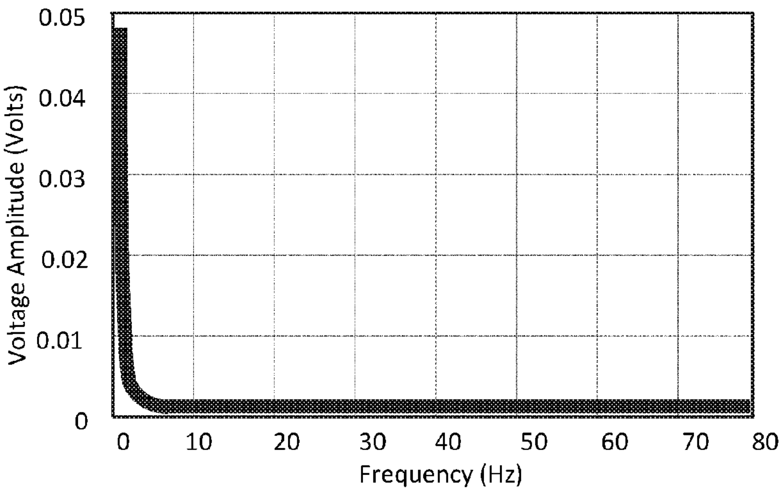
FIG. 8B is a schematic diagram depicting frequency components of the second portion of FIG. 8A.
Figure 9A:
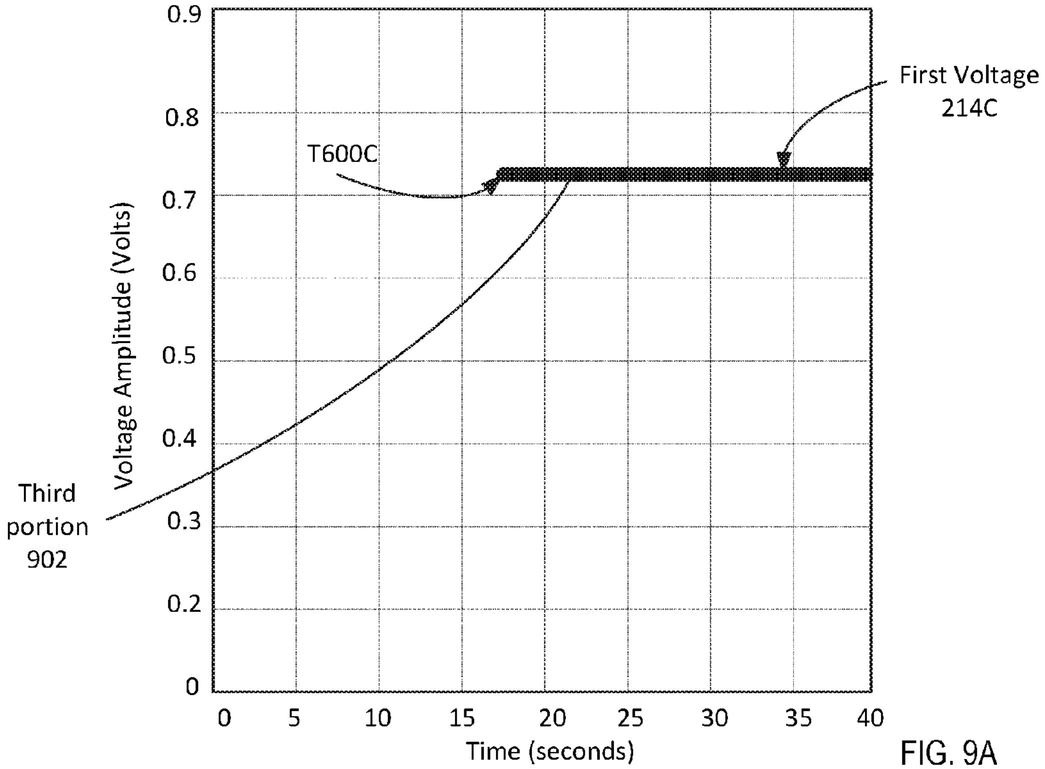
FIG. 9A is a schematic diagram depicting a third portion of the time domain output of FIG. 6.
Figure 9B:
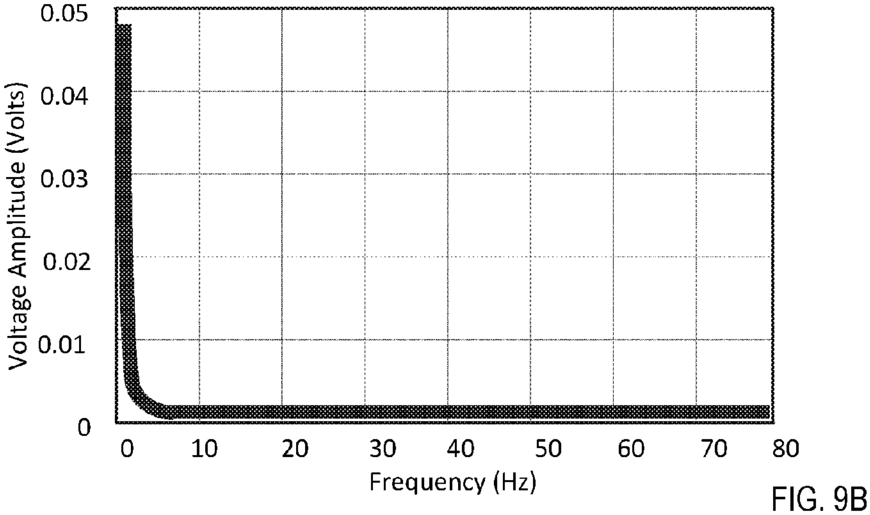
FIG. 9B is a schematic diagram depicting frequency components of the third portion of FIG. 9A.

FIGS. 7A-7B, 8A-8B, and 9A-9B each relate to the nuisance scenario 600 illustrated in FIG. 6. Specifically, FIGS. 7A-7B relate to first portion 702 of first voltage 214C signal (i.e., the portion of the first voltage 214C signal before the first voltage 214C exhibits the rapid increase at T600A), FIGS. 8A-8B relate to second portion 802 of first voltage 214C signal (i.e., the portion of the first voltage 214C signal between time T600A and time T600C, where the first voltage 214C exhibits the rapid increase), and FIGS. 9A-9B relate to third portion 902 of first voltage 214C (i.e., the portion of the first voltage 214C signal where the first voltage 214C levels off after the rapid increase). FIGS. 7B, 8B, and 9B respectively illustrate the frequency components of the first portion, second portion, and third portion of the first voltage 214C signal.

In more detail, and as illustrated in FIG. 7A, the FFT module 280 may identify the first portion 702 of the first voltage 214C. The FFT module 280 may then compute the frequency components of the first portion 702, as illustrated in FIG. 7B. The FFT module 280 may likewise identify the second portion 802 of the first voltage 214C (FIG. 8A) and compute the frequency components thereof (FIG. 8B). The FFT module 280 may also identify the third portion 902 of the first voltage 214C (FIG. 9A) and identify the frequency components of the third portion 902 (FIG. 9B). In some embodiments, the FFT module 280 may implement two time domain to frequency domain transforms instead of three— one transform associated with a portion of the first voltage 214C signal before the first voltage 214C reaches the alarm threshold 290A, and another transform associated with a portion of the first voltage signal 214C after the first voltage 214C is at least equal to the alarm threshold 290A.

As can be appreciated by FIG. 6, and shown more clearly in FIGS. 7A and 9A, the amplitude of the first portion 702 of the first voltage 214C signal is less than the amplitude of the third portion 902 of the first voltage 214C signal. As can further be appreciated by FIGS. 7A, 8A, and 9A, the rate of change of the second portion 802 of the first voltage 214C signal is greater than that of the first portion 702 and the third portion 902. Yet, the frequency components of the first portion 702, the second portion 802, and the third portion 902, as determined by the FFT module 280 and respectively illustrated in FIGS. 7B, 8B, and 9B, are generally identical (e.g., the dominant frequency component for each of the first portion 702, the second portion 802, and the third portion 902 is generally equal to 0 Hz). This is because the entrapped dust in the chamber 102 is stationary. Consequently, dust increases the amplitude of the first voltage 214C signal in the time domain (because of increased scattered light 112S) but does not affect the frequency of the first voltage signal 214C. Conversely, smoke 150 has a movement pattern, and as such, an increasing amount of smoke 150 entering the chamber 102 may affect both the amplitude and the frequency of the output of the photodetector 231. This characteristic may be used by the nuisance monitor 240 to distinguish a nuisance condition from an alarm condition.

Prior art smoke detectors generate an alarm each time the amplitude of the photodetector output reaches the alarm threshold. The nuisance monitor 240, however, via the nuisance identifier 282, may compare the frequency components of the first portion 702, second portion 802, and third portion 902, and determine that they are generally identical (e.g., the dominant frequencies of each of the first portion 702, the second portion 802, and the third portion 902 are the same). The nuisance identifier 282 may therefore determine that the increase in the first voltage 214C is attributable to a nuisance condition. That is, because the first voltage 214C exhibits a rapid increase in the time domain, but exhibits no change in the frequency domain, the nuisance identifier 282 may attribute the rapid increase in the amplitude of the first voltage 214C to a nuisance condition. No alarm may thus be generated, notwithstanding that the first voltage 214C is greater than the first alarm threshold 290A. In this way, by evaluating the output of the photodetector 231 in both the time and frequency domains, the nuisance monitor 240 may significantly reduce false positives as compared to prior art smoke detectors.

Figure 10:
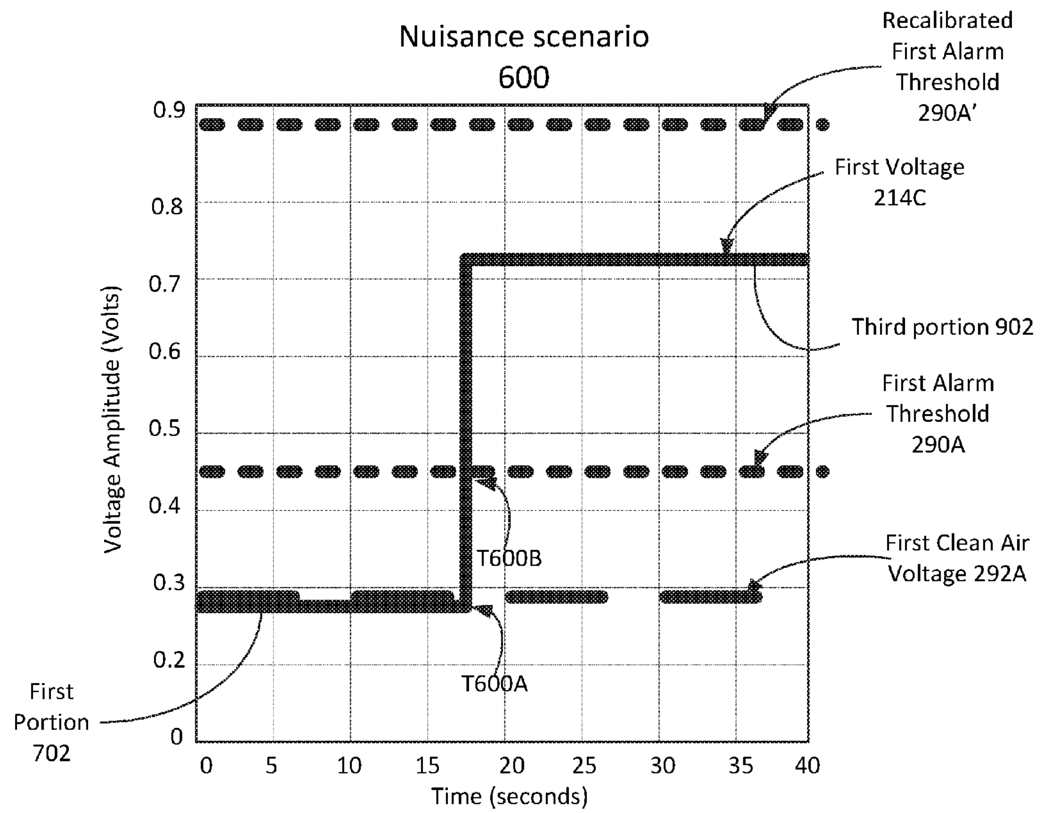
FIG. 10 is a schematic diagram illustrating the recalibration of an alarm threshold associated with the photodetector of the smoke detector of FIG. 2.

In some embodiments, once a nuisance condition (e.g., the nuisance scenario 600) is identified, the calibrator 286 may recalibrate the first alarm threshold 290A. In the illustrated embodiment, and with reference to FIG. 10, the calibrator 286 may determine that the difference between the amplitude of the first portion 702 and the alarm threshold is 0.17V (i.e., 0.45V (alarm threshold)−0.28 (amplitude of first portion 702)=0.17V). The calibrator 286 may therefore recalibrate the first alarm threshold 290A such that it is 0.17V greater than the third portion 902 of the first voltage 214C (i.e., is 0.17V greater than the current steady state value of the first voltage 214C). For example, where the amplitude of the third portion 902 is 0.72V, as shown in FIG. 10, the calibrator 286 may recalibrate the first alarm threshold 290A to the recalibrated first alarm threshold 290A'. In the illustrated example, the recalibrated first alarm threshold 290A' may be 0.89V (i.e., 0.72 (third portion 902 amplitude)+0.17V=0.89V), and this value may replace the first alarm threshold 290A in the alarm threshold 290. Recalibration of the first alarm threshold 290A may allow the smoke detector 200 to continue to function to detect smoke 150 as desired, even where dust is entrapped in the chamber 102.

Figure 11:
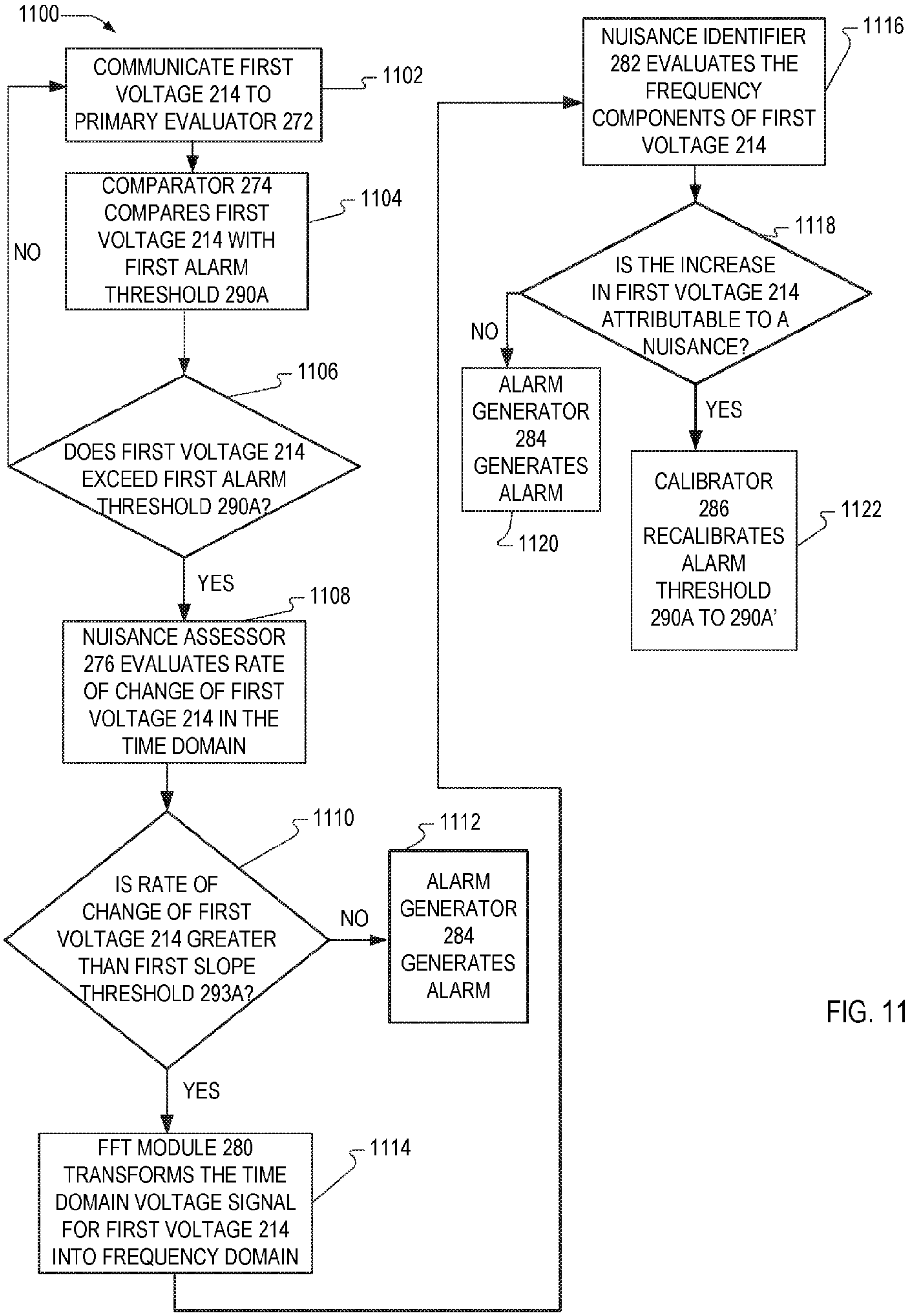
FIG. 11 is a flowchart illustrating a method for identifying a nuisance condition in the smoke detector of FIG. 2, in an embodiment.

FIG. 11 shows a flowchart illustrating an example method 1100 for operating the smoke detector 200 to distinguish between a nuisance condition (e.g., nuisance condition 600) and an alarm condition (e.g., alarm condition 400). The method 1100 may be implemented at least in part by the software 270.

At step 1102, the first voltage 214 (FIG. 2) may be communicated to the primary evaluator 272. At step 1104, the comparator 274 may compare the first voltage 214 with the first alarm threshold 290A. If it is determined at step 1106 that the first voltage 214 does not exceed the first alarm threshold 290A, the method 1100 may return to step 1102. Alternately, if the first voltage 214 exceeds the first alarm threshold 290A at step 1106, the method 1100 may move to step 1108 where the nuisance assessor 276 may evaluate the rate of change of the first voltage 214 in the time domain.

If the nuisance assessor 276 determines at step 1110 that the rate of change of the first voltage 214 is greater than the first slope threshold 293A, the method 1100 may move to step 1114. Alternately, if the nuisance assessor 276 determines that the rate of change of the first voltage 214 is less than the first slope threshold 293A, the method 1100 may move to step 1112 where the alarm generator 284 may generate an alarm to indicate an alarm condition.

At step 1114, the FFT module 280 may convert into the frequency domain the time domain signal of the first voltage 214. For example, as discussed above, the FFT module 280 may parse the first voltage 214 signal into three (or a different number of) portions and determine the frequency components of each. At step 1116, the nuisance identifier 282 may compare the frequency components of different portions of the first voltage 214 signal (e.g., compare the frequency components of the first voltage 214 before, during, and after the rapid increase). If the dominant frequency components of the first voltage 214 before, during, and after the rapid increase are determined by the nuisance identifier 282 to be generally identical, the nuisance identifier 282 may ascertain that the increase in the first voltage 214 is attributable to a nuisance condition. Specifically, if the comparison of the determined frequency components indicates at step 1118 that the increase in the first voltage 214 is attributable to a nuisance condition, no alarm may be generated, and the first alarm threshold 290A may be recalibrated by the calibrator 286 to the recalibrated first alarm threshold 290A' at step 1122. Alternately, where the nuisance identifier 282 does not confirm that the increase in the first voltage 214 is due to a nuisance condition (e.g., where the dominant frequency components of the first voltage 214 before, during, and after the increase are not generally identical), the alarm generator 284 may generate an alarm at step 1120.

Where the smoke detector 200 includes the second light source 220 and the second photodetector 232, the nuisance monitor 240, in the memory 260, may also store the second voltage 224, second alarm threshold 290B, second clean air voltage 292B, and second slope threshold 293B. The primary evaluator 272, specifically the comparator 274 thereof, may compare the second voltage 224 with the second alarm threshold 290B in the same way as discussed above for the first voltage 214. If the comparator 274 determines that the second voltage 224 is greater than the second alarm threshold 290B, the nuisance assessor 276 may identify the rate of change of the second voltage 224 signal in the time domain and compare same to the second slope threshold 293B. Where the rate of change of the second voltage 224 is greater than the slope threshold 293B, the companion evaluator 278 may be called by the primary evaluator 272. The FFT module 280 may identify the frequency components of the second voltage 224 signal (e.g., of the first, the second, and the third portions thereof, as discussed above for the first voltage 214). Where the nuisance identifier 282, via the frequency domain evaluation, determines that the increase in the second voltage 224 is attributable to a nuisance condition (e.g., is attributable to dust entrapped in the chamber 102), the calibrator 286 may recalibrate the second alarm threshold 290B. Alternately, where the nuisance identifier 282 is unable to confirm that the increase in the second voltage 224 is due to a nuisance condition, the alarm generator 284 may generate the alarm. The nuisance monitor 240 may, in embodiments, process the first voltage 214 signal and the second voltage 224 signals in parallel, and an alarm may be generated where either the first voltage 214 or the second voltage 224 at least equals its respective alarm threshold 290A and 290B and a nuisance condition is not identified.

While the disclosure provides specific numerical values (e.g., for the alarm thresholds 290, the clean air voltages 292, the slope thresholds 293, etc.), the artisan will understand that these values are examples only, may depend on the application (e.g., on the configuration of the particular smoke detector at issue), and are not intended to be independently limiting. The artisan may employ the disclosure to, among other things, identify that a change in the photodetector ouput of a smoke detector is attributable to something other than smoke such that an alarm need not be generated.

In some embodiments, the alarm generator 284 may generate an alarm in response to the identification by the nuisance monitor 240 of each of the nuisance and alarm conditions. For example, the alarm generator 284 may generate a warning (or "heads-up") alarm in response to the identification of a nuisance condition and generate an emergency alarm in response to the identification of an alarm condition. The warning alarm may be configured to be milder than the emergency alarm. For example, in an embodiment, the warning alarm may comprise a gentle beep accompanied by a yellow light, and the emergency alarm may comprise a loud siren accompanied by a red light.

In some embodiments, the warning alarm may comprise a warning message that is transmitted by the alarm generator 284 to the mobile device 204B over the interface 202. Additionally or alternately, the smoke detector 200 may include in memory 260 a recording of a human voice, which may be audibly conveyed to the user to apprise the user of a nuisance condition. For example, once a nuisance condition is identified by the nuisance monitor 240, a recording of a human voice asking the user if he wishes to clean the smoke chamber 102 (e.g., if he wishes to remove the dust particles 502, 504 therein) may be played. The user may clean the smoke chamber 102 in response, or alternately, employ an output device (e.g., depress a button on the smoke detector 100) to silence or interrupt the warning alarm. In some embodiments, the user may be allowed to silence or interrupt the warning alarm via the mobile device 204B (e.g., the smoke detector 100 may have associated therewith a mobile application installed on the mobile device 204B, and the user may use an interface of the application to silence or interrupt the warning alarm). For an emergency situation, the alarm may not be so readily silenced and may require additional steps to be turned off.

As noted, when dust entrapped in the smoke chamber 102 causes the first voltage 214 and/or the second voltage 224 to rapidly increase, the alarm thresholds 290A and 290B respectively associated with the first voltage 214 and the second voltage 224 may be recalibrated (i.e., increased) to allow the smoke detector 200 to continue to function as desired. In some instances, however, the increase in the first voltage 214 and/or the second voltage 224 due to the entrapped dust in the smoke chamber 102 may be so substantial that the smoke detector 200 is irreparably damaged. Such may occur, for example, where dust causes either the first voltage 214 and/or the second voltage 224 to rapidly increase by about one order of magnitude or more. Therefore, in embodiments, when the first voltage 214 and/or the second voltage 224 increases to at least equal the respective alarm thresholds 290A and 290B, the comparator 274 may determine if either of the first voltage 214 and/or the second voltage 224 increased by at least one order of magnitude. If such a substantial increase is detected, the alarm generator 284 may generate a head-up alarm (e.g., a visual or audible alarm, a notification to the mobile computing device 204B, etc.) to apprise the user that the smoke detector 200 is irreparably damaged and ought to be replaced.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for distinguishing between an alarm condition and a nuisance condition in a smoke detector, said smoke detector comprising an illuminator and a light sensor, said method comprising:

measuring a voltage signal in response to an electromagnetic signal emitted by said illuminator;

comparing said voltage signal to an alarm threshold;

determining a rate of change of said voltage signal in response to said comparison of said voltage signal and said alarm threshold;

determining a first frequency component of a first portion of said voltage signal and a second frequency component of a second portion of said voltage signal;

comparing said first frequency component and said second frequency component to distinguish between said alarm condition and said nuisance condition; and generating an indication of said alarm condition upon an identification of said alarm condition and an indication of said nuisance condition upon an identification of a nuisance condition;

wherein, said nuisance condition is identified where said first frequency component is within a tolerance of said second frequency component.

2. The method of claim 1, further comprising the step of identifying said nuisance condition in response to entrapment of dust in a smoke chamber of said smoke detector.

3. The method of claim 1, further comprising the step of identifying said nuisance condition where said first frequency component is the same as said second frequency component.

4. The method of claim 3, further comprising the step of recalibrating said alarm threshold based on said identification of said nuisance condition.

5. The method of claim 1, further comprising the step of identifying said alarm condition where said first frequency component is disparate from said second frequency component.

6. The method of claim 5, further comprising the step of communicating said indication of said alarm condition to a mobile device of a user.

7. The method of claim 1, further comprising the step of measuring a second voltage signal in response to a second electromagnetic signal emitted by said illuminator.

8. The method of claim 1, further comprising the step of using a Fast Fourier Transform to determine said first frequency component and said second frequency component.

9. A smoke detector, comprising:
- an illuminator configured to emit an electromagnetic signal;
- a light sensor configured to generate a voltage signal in response to said electromagnetic signal;
- a memory storing computer-readable instructions; and
- a processor configured to execute said instructions to:
  - compare said voltage signal to an alarm threshold;
  - determine a rate of change of said voltage signal;
  - compare said rate of change of said voltage signal to a slope threshold;
  - determine a first frequency component of a first portion of said voltage signal and a second frequency component of a second portion of said voltage signal; and
  - identify a nuisance condition when said first frequency component is within a tolerance of said second frequency component.

10. The smoke detector of claim 9, wherein said processor is configured to use a Fast Fourier Transform to determine said first frequency component.

11. The smoke detector of claim 9, further comprising a calibrator to recalibrate said alarm threshold based on said identification of said nuisance condition.

12. The smoke detector of claim 10, further comprising a network interface to communicate with a mobile device in response to said identification of said nuisance condition.

13. The smoke detector of claim 10, further comprising an alarm generator to generate an alarm in response to a determination of an alarm condition.

14. The smoke detector of claim 9, further comprising a nuisance identifier configured to identify a nuisance condition in response to entrapment of dust in a smoke chamber of said smoke detector.

15. A method for operating a smoke detector, said smoke detector comprising an illuminator and a light sensor, said method comprising:
- measuring a voltage signal in response to an electromagnetic signal emitted by said illuminator;
- comparing said voltage signal to an alarm threshold;
- determining a rate of change of said voltage signal in response to said comparison of said voltage signal and said alarm threshold;
- determining a first frequency component of a first portion of said voltage signal and a second frequency component of a second portion of said voltage signal upon said determination of said rate of change; and
- identifying a nuisance condition when said first frequency component is within a tolerance of said second frequency component.

16. The method of claim 15, further comprising the step of comparing said rate of change of said voltage signal to a slope threshold.

17. The method of claim 15, further comprising the step of generating an alarm based on a determination that said rate of change is less than said alarm threshold.

18. The method of claim 15, further comprising the step of using a calibrator to recalibrate said alarm threshold based on said identification of said nuisance condition.

19. The method of claim 18, further comprising the step of operably coupling said smoke detector to a remote data source.

20. The method of claim 15, further comprising the step of communicating with a mobile device in response to said identification of said nuisance condition; said nuisance condition being attributable to dust entrapped in a smoke chamber of said smoke detector.

* * * * *